M. O. HENDERSON.
TRACTION WHEEL.
APPLICATION FILED FEB. 18, 1919.
1,316,951.
Patented Sept. 23, 1919.
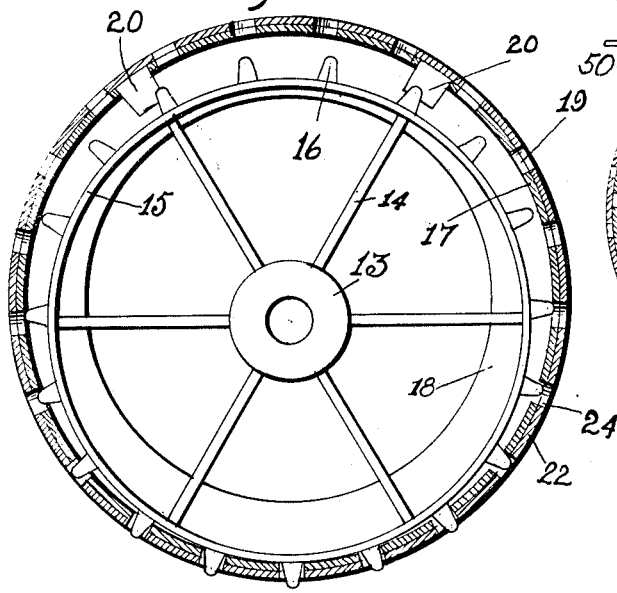
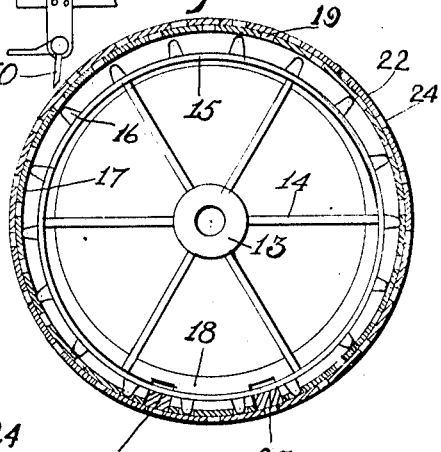
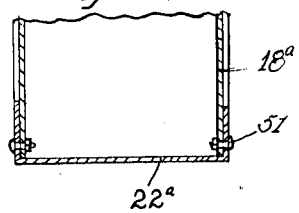
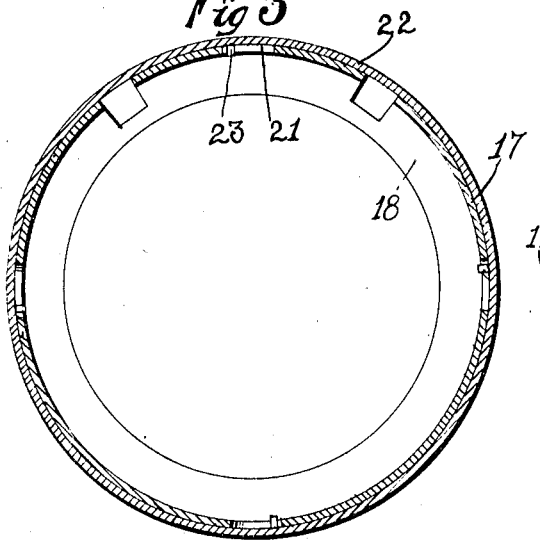
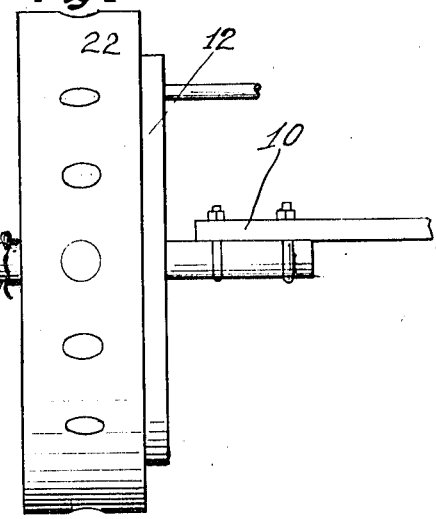
Witness
Nevin A Trissel
Inventor
Morris O. Henderson
By Orwig & Bair Attys.

UNITED STATES PATENT OFFICE.

MORRIS O. HENDERSON, OF NEAR STORY CITY, IOWA.

TRACTION-WHEEL.

1,316,951.  Specification of Letters Patent.  Patented Sept. 23, 1919.

Application filed February 18, 1919. Serial No. 277,711.

*To all whom it may concern:*

Be it known that I, MORRIS O. HENDERSON, a citizen of the United States, and residing near Story City, in the county of Hamilton and State of Iowa, have invented a certain new and useful Traction-Wheel, of which the following is a specification.

The object of my invention is to provide a traction wheel of simple, durable and inexpensive construction.

More particularly it is my object to provide a traction wheel comprising an inner wheel member provided with lugs on its inner rim, and to provide an outer rim having openings arranged to correspond substantially to said lugs, said outer rim member preferably comprising an inwardly opening channel and an outer rim mounted for limited sliding movement on said channel.

Still a further object is to provide such an outer rim member comprising the parts above mentioned, the channel and the other slidable rim having openings adapted in one position of the sliding movement of the outer rim to register, and in another position to be out of registry, with each other.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of my improved traction wheel, the outer wheel member being shown in central, vertical section.

Fig. 2 shows a similar view with the parts of the outer wheel member in different relative positions.

Fig. 3 shows a vertical sectional view through the outer wheel members only, illustrating the manner in which they are connected.

Fig. 4 shows a rear elevation of a traction wheel embodying my invention; and

Fig. 5 shows a sectional view of a modified form of the outer channel-shaped rim.

In the accompanying drawings I have used the reference numeral 10 to indicate generally the frame of a vehicle on which my traction wheel is used. The traction wheel may be mounted upon an axle 11, and may be operated by means of suitable gearing devices or the like 12.

The traction wheel consists of a hub 13, having spokes 14 radiating therefrom. On the outer ends of the spokes 14 is a rim 15, having a series of outwardly extending lugs 16 which may be made in various forms.

An outer wheel is provided, comprising two parts. One of the parts consists of an inwardly opening channel of considerably greater diameter than the maximum diameter of the inner wheel, and comprising an outer member 17 and side wall members 18. The portion 17 of the channel is provided with a series of holes 19, spaced from each other circumferentially of said channel at distances corresponding to the spacing of the lugs 16 on the rim of the inner wheel. The side walls 18 are provided with pairs of opposite openings 20, the purpose of which will be hereinafter more fully explained.

The portion 17 of the channel is also provided with a plurality of circumferentially elongated slots 21 near its side edges.

Outside the channel hereinbefore described is an annular rim 22, adapted to slide circumferentially on the member 17 and provided with a plurality of pins 23 which project into the slots 21. The rim 22 is also provided with a series of holes 24, spaced from each other circumferentially and adapted in one position of the rim 22 with relation to the member 17, to register with the holes 19.

In the ordinary use of the traction wheel the holes 19 and 24 are brought to registering position, and when the wheel is rotated the inner wheel will travel in the outer wheel member and the lugs 16 will successively enter the holes 19 and 24, causing the outer wheel member to travel forwardly with the inner wheel. The lugs engage the ground the same as the lugs on any traction wheel, and serve the same purpose of preventing skidding and sliding. As the lugs leave the holes, they clean themselves.

When it is desired to use my traction wheel with a smooth rim, blocks 25 are inserted through the respective pairs of openings 20 when such openings are at the upper part of the wheel. As the wheel rotates and the blocks reach the bottom of the wheel, it will be seen that the inner wheel will be lifted with relation to the outer wheel member, until the lugs at the bottom of the wheel withdraw from the openings 24 but remain projected into the openings 19. Thereupon the rim 22 will slide with relation to the member 17 of the channel, until the holes 24 are out of registry with the holes 19. The limit of such sliding movement is determined by the length of the slots 21. When the wheel rotates far enough to bring the holes 20 to the upper part of the wheel again, the blocks 25 are withdrawn. The traction wheel may then be used with a smooth rim as long as may be desired, for traveling over pavement or hard roads.

When it is desired to slide the channel with relation to the outer rim 22 in the opposite direction for again bringing the holes in the channel into registry with the holes in the rim 22, the movement of the inner wheel is reversed, whereupon the channel will slide in the opposite direction with relation to the outer rim 22 until the holes in the channel come to registry with the holes in the rim 22, whereupon the lower lugs will again project through the holes 19 and 24, as illustrated in Fig. 1.

In case the channel should not slide freely with relation to the outer rim 22, it is obvious that any suitable means may be provided for holding the rim 22 against rotation for an instant.

It will be seen from the foregoing that I have provided a traction wheel with self-cleaning lugs. Such a device makes it possible to use much smaller lugs than are necessary on the ordinary traction wheel, with a saving of material and with the result of making an easier traveling wheel.

By very slight adjustment of the parts, a wheel with a smooth rim may be provided.

The advantages of such a structure are largely obvious from the statement of the structure.

A suitable scraper or cleaner 50 may be provided for scraping mud and the like from the outside rim.

In Fig. 5 I have shown a slightly modified form of the outside rim, in which the outer member 22ª is detachably secured to the side members 18ª by means of bolts or the like 51.

Some changes may be made in the construction and arrangement of the various parts of my traction wheel without departing from the essential features and purposes of my invention, and it is my intention to cover by my claims any modified forms of structure or use of mechanical equivalents which may be reasonably included within their scope.

I claim as my invention:

1. A traction wheel comprising an inner wheel having a rim with outwardly projecting lugs, an outer wheel member comprising an inwardly opening channel of greater diameter than the wheel proper, and provided with holes adapted to successively receive the lugs, and adjustable means for closing the holes in said outer wheel member.

2. A traction wheel comprising an inner wheel having a rim with outwardly projecting lugs, an outer wheel member comprising an inwardly opening channel of greater diameter than the wheel proper, and provided with holes adapted to successively receive the lugs, and a rim on the outer surface of said outer wheel member, and adapted to move circumferentially of the outer wheel member, and having holes adapted in one position of said outer rim to register with the holes in the outer wheel member.

3. A traction wheel comprising an inner wheel having a rim with outwardly projecting lugs, an outer wheel member comprising an inwardly opening channel of greater diameter than the wheel proper, and provided with holes adapted to successively receive the lugs, a rim on the outer surface of said outer wheel member, and adapted to move circumferentially of the outer wheel member, and having holes adapted in one position of said outer rim to register with the holes in the outer wheel member, and means for limiting the movement of the outer rim with relation to the outer wheel member.

4. A traction wheel comprising an inner wheel having a rim with outwardly projecting lugs, an outer wheel member comprising an inwardly opening channel of greater diameter than the wheel proper, and provided with holes adapted to successively receive the lugs, a rim on the outer surface of said outer wheel member, and adapted to move circumferentially of the outer wheel member, and having holes adapted in one position of said outer rim to register with the holes in the outer wheel member, and means for limiting the movement of the outer rim with relation to the outer wheel member, said outer wheel member having opposite holes in its side walls.

Des Moines, Iowa, January 30, 1919.

MORRIS O. HENDERSON.